United States Patent
Yuan (10) Patent No.: US 12,168,917 B2
(45) Date of Patent: Dec. 17, 2024

(54) SYSTEMS AND METHODS FOR CONTROLLING A VERTICAL PUMPING UNIT

(71) Applicant: Forland Services LLC, Houston, TX (US)

(72) Inventor: Dong Yuan, Houston, TX (US)

(73) Assignee: Forland Services LLC, Houston, TX (US)

( * ) Notice: Subject to any disclaimer, the term of this patent is extended or adjusted under 35 U.S.C. 154(b) by 952 days.

(21) Appl. No.: 17/199,196

(22) Filed: Mar. 11, 2021

(65) Prior Publication Data

US 2022/0290536 A1    Sep. 15, 2022

(51) Int. Cl.
| | |
|---|---|
| E21B 43/12 | (2006.01) |
| E21B 47/009 | (2012.01) |
| F04B 47/02 | (2006.01) |
| F04B 49/02 | (2006.01) |
| G01D 5/347 | (2006.01) |

(52) U.S. Cl.
CPC .......... *E21B 43/127* (2013.01); *E21B 47/009* (2020.05); *F04B 47/022* (2013.01); *F04B 49/02* (2013.01); *G01D 5/3473* (2013.01)

(58) Field of Classification Search
CPC ...... F04B 47/022; F04B 49/02; F04B 49/065; F04B 51/00
See application file for complete search history.

(56) References Cited

U.S. PATENT DOCUMENTS

| | | |
|---|---|---|
| 4,430,924 A | 2/1984 | Dunn et al. |
| 2011/0097214 A1 | 4/2011 | Wentworth et al. |
| 2019/0242223 A1* | 8/2019 | Liu ........................ G05B 19/05 |
| 2020/0018305 A1* | 1/2020 | Chen ....................... F04B 51/00 |
| 2021/0081823 A1* | 3/2021 | Boguslawski ........ E21B 43/127 |
| 2022/0381120 A1* | 12/2022 | Nimbalkar ............ E21B 47/008 |

* cited by examiner

*Primary Examiner* — Kenneth J Hansen
(74) *Attorney, Agent, or Firm* — Bochner PLLC; Andrew D Bochner; Eric R Kleinertz (57) ABSTRACT

Systems and methods for controlling a vertical pumping unit are provided. The method includes a self-learning phase and a running phase, wherein the self-learning phase includes obtaining a self-learning result and the running phase includes controlling a motor of the vertical pumping unit to run according to the self-learning result and preset running parameters. The method enables the vertical pumping unit to adjust running parameters of the running phase according to the self-learning results, avoid the accumulation of errors effectively so that changes in stroke length and stroke frequency caused by the motor V-belt, load belt extension and retraction and other elastic links are limited to a minimum range so as to ensure the running accuracy of the vertical pumping unit.

5 Claims, 3 Drawing Sheets

SYSTEMS AND METHODS FOR CONTROLLING A VERTICAL PUMPING UNIT

BACKGROUND

The present disclosure relates generally to a power control method, and in particular, to a vertical pumping unit as well as the control system and method thereof.

Vertical pumping units are commonly-used reciprocating rod pump oil extraction systems, which can be found in oilfields. Most of the power driving systems of the vertical pumping units employ belts, gears, rope-wheel systems and chain transmission systems. The weight boxes and pumping unit load ends are commonly connected through load belts and there may exist errors in stroke length or stroke frequency due to transmission clearance and elastic extension and retraction of the belt in a long-stroke running process.

Known control methods for vertical pumping units are poor in intelligence, and it is impossible to modify the parameter of stroke length in a running process of the pumping unit. For a few vertical pumping units, although the stroke length may be regulated, operators have to manually adjust the stroke length through the mechanical structure. Moreover, the running process is complicated and cannot compensate for the changes in the stroke length and stroke frequency caused by the motor V-belt, load belt extension and retraction and other elastic links, which may influence the safety and pumping efficiency of the pumping unit and is unfavorable for management and maintenance of the vertical pumping unit.

US Patent App. Pub. No. 2011/0097204 discloses a method of operating an oil well, which includes applying a variable frequency drive AC electrical energy from a power grid to an AC electric motor to operate a drive mechanism of an oil well vertical pumping unit. The method requires two sensors: one is a load sensor, which monitors the tension in the pumping unit load end and provides a tension signal corresponding to the measured tension; the other one is a position sensor installed at the end of the downward stroke, which detects when the pumping unit load end is in a predetermined position (for example, at the end of the downward stroke) during the stroke cycle and provides a signal when the pumping unit load end is in the predetermined position. The function of the above-mentioned two sensors is to obtain dynamometer cards and achieve speed regulation, yet remaining the determination and modification of the stroke length unsolved.

U.S. Pat. No. 4,430,924 discloses a vertical pumping unit in which two limit switches are installed in a hydraulic cylinder to determine the forced reversing positions of the upward and the downward strokes so as to be used for stroke length control. However, the control accuracy of the above-mentioned stroke length control is poor, and the adjustment of the limit switches needs to be realized by manually adjusting the mechanical structure and thus the operation is complicated.

Therefore, there is a need for a control system and method for vertical pumping units in order to easily and intelligently ensure the running accuracy of the vertical pumping unit, which can be automatically and synchronously adjusted according to the conditions of liquid level under the well during the running phase based on the self-learning results.

SUMMARY

A main purpose of the present disclosure is to control a vertical pumping unit so that the vertical pumping unit can adjust the running parameters of the running phase according to the self-learning result, avoid the accumulation of errors effectively, and make the changes in stroke length and stroke frequency caused by the motor V-belt, load belt extension and retraction and other elastic links be limited to a minimum range in order to ensure that the running accuracy of the vertical pumping unit can be adjusted automatically and synchronously according to the conditions of liquid level under the well.

In order to achieve the above-mentioned objective, a method for a control system of a vertical pumping unit is provided according to one aspect of the present disclosure.

According to an aspect of the present disclosure, a method for a control system of a vertical pumping unit comprises a self-learning phase and a running phase, wherein the self-learning phase comprises obtaining a self-learning result, and the running phase comprises controlling the motor of the vertical pumping unit to run according to the self-learning result and preset running parameters.

According to other aspects of the present disclosure, the self-learning phase includes the following steps: controlling the motor of the vertical pumping unit according to initialization parameters to drive the pumping unit load end via the transmission system, wherein the transmission system is equipped with a position signal trigger and a shaft end of the motor is equipped with a position encoder; causing the vertical pumping unit to start running according to the initial full stroke length and initial stroke frequency, wherein in each stroke cycle, when the position signal trigger reaches the forced reversing position sensor or the midpoint position sensor in the position sensor device, the position sensor device is triggered to generate the corresponding position signal, and wherein the control system is configured to read the position signal and control the motor to continue running in the same direction or to run in the reversing direction according to the position signal, and the control system recording the position data of the position encoder each time a position signal is triggered; and obtaining the self-learning result by calculating the average value of the position data of the position encoder.

The running phase may include: controlling the motor of the vertical pumping unit to run according to the self-learning result and the preset running parameters in the running process, and wherein the control system is configured to read and record the stroke frequency of the running phase, and when the position signal trigger reaches a position sensor in the position sensor device, the control system is configured to read the corresponding position signal generated by the position sensor device.

The method enables the vertical pumping unit to adjust the running parameters of the running phase according to the self-learning results, avoid the accumulation of errors effectively so that the changes in stroke length and stroke frequency caused by the motor V-belt, load belt extension and retraction and other elastic links are limited to a minimum range so as to ensure the running accuracy of the vertical pumping unit.

According to other aspects of the present disclosure, the position sensor device includes a midpoint position sensor, an upper forced reversing position sensor and a lower forced reversing position sensor; and the position signal trigger is a rotary disc type position signal trigger or a translational type position signal trigger.

According to other aspects of the present disclosure, the self-learning phase further includes: generating a midpoint position signal when the position signal trigger runs to reach the midpoint position sensor, and the control system being configured to read the midpoint position signal and drive the motor to continue running in the same direction.

According to other aspects of the present disclosure, the self-learning phase further includes: generating an upper forced reversing position signal or a lower forced reversing position signal when the position signal trigger runs to reach the upper forced reversing position sensor or the lower forced reversing position sensor, the control system reading the upper forced reversing position signal or the lower forced reversing position signal and driving the motor to run in the reversing direction.

According to other aspects of the present disclosure, the self-learning phase further includes shutting down the pumping unit forcibly when the position signal trigger runs to reach the limit position.

According to other aspects of the present disclosure, the self-learning result includes a first self-learning result and a second self-learning result.

According to other aspects of the present disclosure, the first self-learning result is the average value of the encoder that is associated with full stroke length. The average value of the encoder is determined as the sum of the absolute value of the position encoder corresponding to the upper forced reversing position signal and the absolute value of the position encoder corresponding to the lower forced reversing position signal in a multi-stroke self-learning process, wherein the first self-learning result is given by:

$$Y=\alpha X,$$

where Y is the average value of the encoder that is associated with the full stroke length in the self-learning phase, X is the full stroke length preset in the self-learning phase, and $\alpha$ is the conversion factor for the average value of the encoder obtained in the self-learning phase and the full stroke length preset in the self-learning phase.

According to other aspects of the present disclosure, the second self-learning result is associated with the corresponding average value of the encoder for upper half stroke and the corresponding average value of the encoder for lower half stroke, wherein: the average value of the encoder for upper half stroke is the difference between the absolute value of the position encoder corresponding to the upper forced reversing position signal and the absolute value of the position encoder corresponding to the midpoint position signal in the multi-stroke self-learning process, the average value of the encoder for upper half stroke being associated with the upper half stroke of the full stroke; and the average value of the encoder for lower half stroke is the difference between the absolute value of the position encoder corresponding to the lower forced reversing position signal and the absolute value of the position encoder corresponding to the midpoint position signal in the multi-stroke self-learning process, and the average value of the encoder for lower half stroke being associated with the lower half stroke of the full stroke.

According to other aspects of the present disclosure, the running phase further includes a step of setting running parameters manually, wherein the running parameters comprise stroke length and stroke frequency, and the preset stroke length is converted by the control system into the corresponding position value of the position encoder, and when the motor runs to the position value, the control system controls the motor to reverse forcibly and run in an opposite direction.

According to other aspects of the present disclosure, the running phase further includes a step of determining whether or not the value of the preset stroke length is equal to the value of the full stroke length. If the value of the preset stroke length is equal to the value of the full stroke, the control system may control the motor to run according to the first self-learning result (that is, the average value of the encoder associated with the full stroke obtained in the self-learning phase). However, if the value of the preset stroke length is less than the value of the full stroke, the control system may control the motor to run the corresponding position value of the position encoder that is associated to the preset stroke length.

According to other aspects of the present disclosure, the running phase further includes a step of determining whether or not there is a difference between the upward stroke frequency and the downward stroke frequency. If there is no difference, the control system may control the motor to run according to the preset stroke frequency. However, if there is a difference: the method may further include setting the clockwise rotation speed and/or counterclockwise rotation speed of the motor manually, and the control system may be configured to control the motor to run at the clockwise rotation speed and/or the counterclockwise rotation speed.

According to other aspects of the present disclosure, the running phase further includes a step of determining whether or not there is a difference between the upper half stroke length and the lower half stroke length. If there is no difference, the control system may control the motor to run according to the position value of the position encoder corresponding to the preset stroke length. However, if there is a difference, the control system may control the motor to run according to the second self-learning result (that is, the average value of encoder for the upper half stroke and the average value of encoder for the lower half stroke obtained in the self-learning phase).

According to other aspects of the present disclosure, the running phase further includes shutting down the pumping unit forcibly when the position signal trigger runs to the limit position.

The method of the present disclosure may adjust the stroke of the pumping unit, that is, the vertical pumping unit can adjust the running parameters of the running phase according to the self-learning result and the changes in the stroke length and the stroke frequency caused by the motor V-belt, load belt extension and retraction and other elastic links are limited in a minimum range. Further, a malfunction caused by the position signal trigger running beyond the limit position may be avoided through the judgement steps in the above-mentioned method for stroke control.

According to another aspect of the present disclosure, a control system is configured for a vertical pumping unit, including a power box, a programmable logic controller, a position signal trigger device, a position sensor device a position encoder, a remote communication modulus and a remote monitoring system, wherein the control system of a vertical pumping unit is configured to perform the above-mentioned method.

According to other aspects of the present disclosure, the programmable logic controller includes a central processing unit.

According to other aspects of the present disclosure, the central processing unit includes a register that is used for recording the position data of the position encoder in the self-learning phase and recording the preset stroke length and stroke frequency.

According to other aspects of the present disclosure, the programmable logic controller logically associates the stroke length with the position value of the position encoder so that the transmission system runs in a predetermined mode.

According to other aspects of the present disclosure, the remote monitoring system is installed in a central control room, the programmable logic controller, the power box and the remote communication modulus are installed in a control cabinet next to the rack, and the position encoder is installed on a shaft end of the driving motor.

The control system of the present disclosure may perform self-learning through position encoder and position sensor signals in the self-learning phase, and may correct the running inaccuracy or errors of the pumping unit according to the self-learning results in the running phase, and changes parameters like the stroke length and stroke frequency according to the preset parameters through a human-computer interaction interface.

According to another aspect of the present disclosure, a vertical pumping unit as mentioned includes: a rack, a driving system that provides driving power to the vertical pumping unit, a transmission system supported by the rack, and the above-mentioned control system for controlling the driving system.

The control system of vertical pumping unit of the present disclosure may control the movement of the pumping unit load end through the driving system and transmission system. The system may identify and adjust the upper half stroke length, the lower half stroke length and the stroke frequency in the running phase through the position sensors and the position signal trigger mounted on the transmission system according to the self-learning results.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

A more complete understanding of the components, processes and apparatuses disclosed herein can be obtained by reference to the accompanying drawings. These drawings are merely schematic representations for convenience and ease of demonstrating the present disclosure, and are, therefore, not intended to indicate relative sizes and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the terms "comprise(s)," "include(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any unavoidable impurities that might result therefrom, and excludes other ingredients/steps.

As described in the background section, the common vertical pumping unit known in the prior art may have some issues such as the errors in stroke length or stroke frequency due to transmission system clearance and elastic extension and retraction of the belts in a long-stroke running process and lack of means for intelligent adjustment of the running accuracy of the vertical pumping unit.

In order to solve these problems, the present disclosure provides a method for the control system of a vertical pumping unit, which comprises a self-learning phase and an running phase. The self-learning phase may generally comprise obtaining a self-learning result, and the running phase may generally comprise controlling the motor of the vertical pumping unit to run according to the self-learning result and preset running parameters. At the same time, the present disclosure also provides a corresponding vertical pumping unit and control system thereof. The vertical pumping unit, the control system and method thereof will be described below in conjunction with the drawings.

In a preferred embodiment, the self-learning phase of the above-mentioned control method comprises the following steps: (1) controlling the motor 21 of the vertical pumping unit according to the initialization parameters to drive a pumping unit load end 38 to run slowly via a transmission system 3, wherein the transmission system 3 is equipped with a position signal trigger 341 and the shaft end of motor 21 is equipped with a position encoder 43; (2) causing the vertical pumping unit to start running according to the initial full stroke length and initial stroke frequency, wherein in each stroke cycle, when the position signal trigger 341 reaches the forced reversing position sensor or the midpoint position sensor in the position sensor device 41, the position sensor device 41 is triggered to generate a corresponding position signal, and the control system reading the position signal and controlling the motor to continue running in the same direction or to run in the reversing direction according to the position signal, and the control system recording the position data of the position encoder 43 each time when the position signal is triggered; and (3) obtaining the self-learning result by calculating the average value of position data of the position encoder.

In a preferred embodiment, the running phase of the above-mentioned control method comprises: controlling the motor 21 of the vertical pumping unit to run according to the self-learning result and the preset running parameters in the running process, and the control system reading and recording the stroke frequency of the running phase, and when the position signal trigger 341 reaches a position sensor in the position sensor device, the control system reading the corresponding position signal generated by the position sensor device 41.

Figure 1:
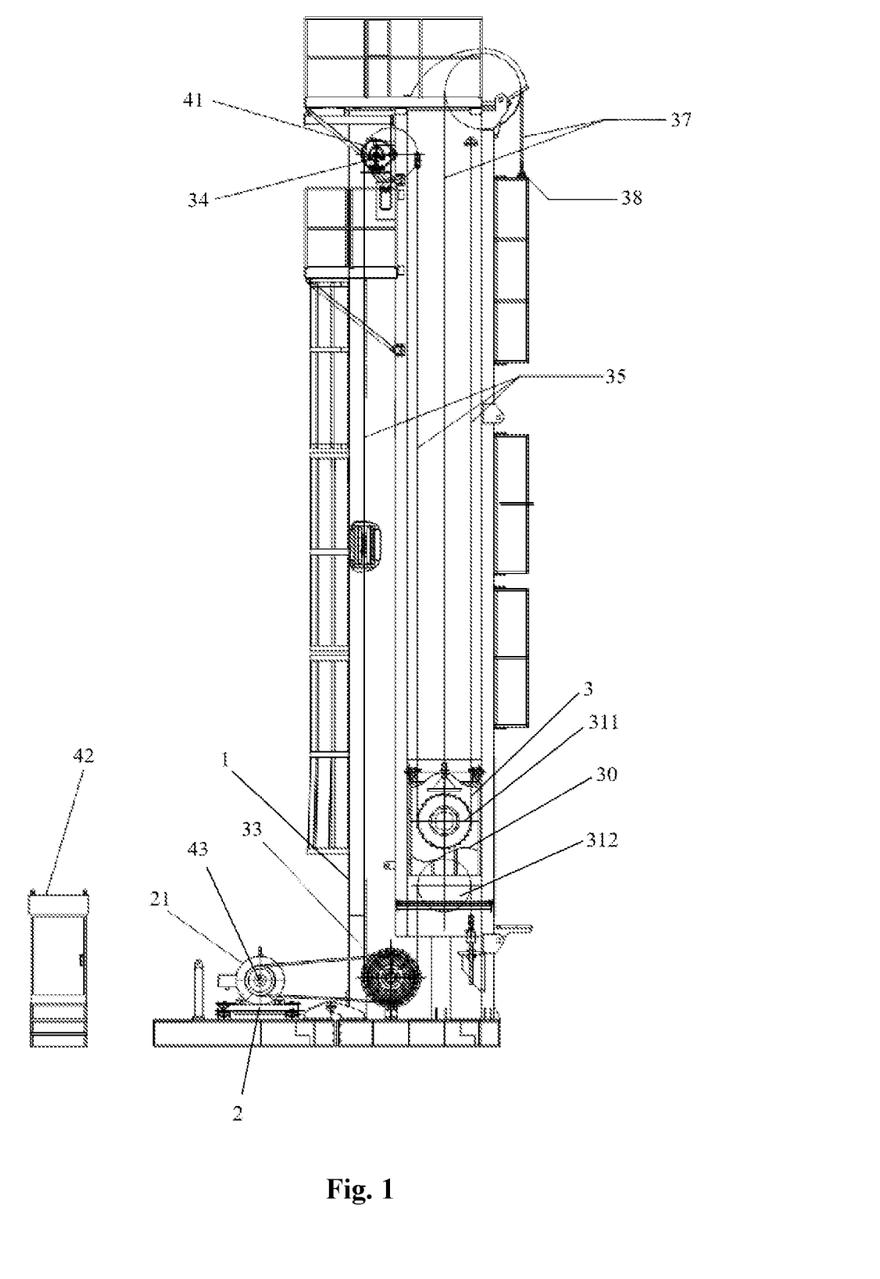
FIG. 1 is a schematic system overview of a vertical pumping unit to which the control method of the present disclosure is applied.

FIG. 1 shows a preferred embodiment illustrating the system overview of a vertical pumping unit to which the control method of the present disclosure is applied. As shown, the vertical pumping unit comprises a rack 1, a driving system 2 that provides driving power to the vertical pumping unit, a transmission system 3 supported by the rack 1, and a control cabinet 42 of the control system that controls the driving system 2. The power control method of the present disclosure is applied to the vertical pumping unit. The vertical pumping unit may be any vertical pumping unit in the prior art, including a belt driven pumping unit or a chain driven pumping unit.

The transmission system 3 may comprise, but is not limited to, a driving sprocket 33, an upper driven sprocket 34, an upper traveling sprocket 311, a lower traveling sprocket 312, a transmission chain 35, and a balance box 30. Both of the upper traveling sprocket 311 and the lower traveling sprocket 312 are positioned on the balance box 30, and an upper end of the transmission chain 35 is fixed on the top of the rack 1. The transmission chain 35 is sequentially wound on the upper traveling sprocket 311, the upper driven sprocket 34, and the driving sprocket 33 and the lower traveling sprocket 312, and its other end is fixed at bottom of the rack 1. The balance box 30 and the pumping unit load end 38 are connected by a load belt 37 and are located on both sides of the drum on the top of the rack 1 respectively.

The position sensor device 41 is located at the upper driven sprocket 34 at the upper end of the rack 1. The motor 21 of the driving system 2 drives the driving sprocket 33 to rotate. When the driving sprocket 33 rotates counterclockwise, it drives the transmission chain 35 mounted on driving sprocket 33 to move. The transmission chain 35 drives the upper traveling sprocket 311 to rotate clockwise and drives the lower traveling sprocket 312 to rotate clockwise. Since the two ends of the chain are fixed, the balance box 30 and upper/lower sprockets move upwards along the rack 1 as a whole, and the pumping unit load end 38 connected with the balance box 30 moves downwards through the belt to enter into a well.

When the position signal trigger 341 reaches the lower forced reversing position sensor in the position sensor device 41, the position sensor device 41 is triggered to generate a lower forced reversing position signal. The programmable logic controller in the control cabinet 42 of the control system reads the lower forced reversing position signal and controls the reversing running of the motor 21 of the driving system 2 according to the lower forced reversing position signal. The programmable logic controller records the position data of the position encoder 43 on the shaft end of the motor 21 at the same time when the lower forced reversing position signal is triggered, and the reversing running of the motor 21 causes the driving sprocket 33 to rotate in the opposite direction, which drives the balance box 30 to move downward and lift the pumping unit load end 38 upward. When the position signal trigger 341 reaches the upper forced reversing position sensor in the position sensor device 41, the position sensor device 41 is triggered to generate an upper reversing position signal. The programmable logic controller in the control cabinet 42 of the control system reads the upper forced reversing position signal, and controls the reversing running of the motor 21 of the driving system 2 according to the upper forced reversing position signal. The programmable logic controller records the position data of the position encoder 43 on the shaft end of the motor 21 at the same time when the upper reversing signal is triggered. The reversing running of the motor 21 causes the driving sprocket 33 to rotate in the reverse direction, which drives the balance box 30 to move upward and lift the pumping unit load end 38 downward. At this point, one oil extraction cycle is completed, and the next oil extraction cycle will be entered. The pumping unit load end of the vertical pumping unit is driven by the motor of the driving system to reciprocate for an upward stroke and a downward stroke to complete oil exploitation and lifting.

In a working process of the vertical pumping unit, the pumping unit load end reciprocates, that is, moves alternately downward and upward. The pumping unit load end runs upwards to form an upward stroke, and the pumping unit load end runs downwards to form a downward stroke. The upward stroke and the downward stroke form a running stroke cycle. Taking a midpoint position of the upward stroke as a boundary, in the upward stroke, when the pumping unit load end gets closer to the midpoint position, the pumping unit load end runs in a lower section of upward stroke, and when the pumping unit load end gets further away from the midpoint position, the pumping unit load end runs in an upper section of upward stroke. Similarly, taking a midpoint position of the downward stroke as a boundary, in the downward stroke, when the pumping unit load end gets closer to the midpoint position, the pumping unit load end runs in an upper section of downward stroke and when the pumping unit load end gets further away from the midpoint position, the pumping unit load end runs in a lower section of downward stroke. Thus it can be seen that a cyclic working sequence of the pumping unit load end is as follows: the upper section of upward stroke—the upper section of downward stroke—the lower section of downward stroke—the lower section of upward stroke—the upper section of upward stroke . . . etc. In the upward stroke, the pumping unit load end reaches the midpoint position when the lower section of upward stroke comes to an end. In the downward stroke, the pumping unit load end reaches the midpoint position when the upper section of downward stroke comes to an end.

Figure 2:
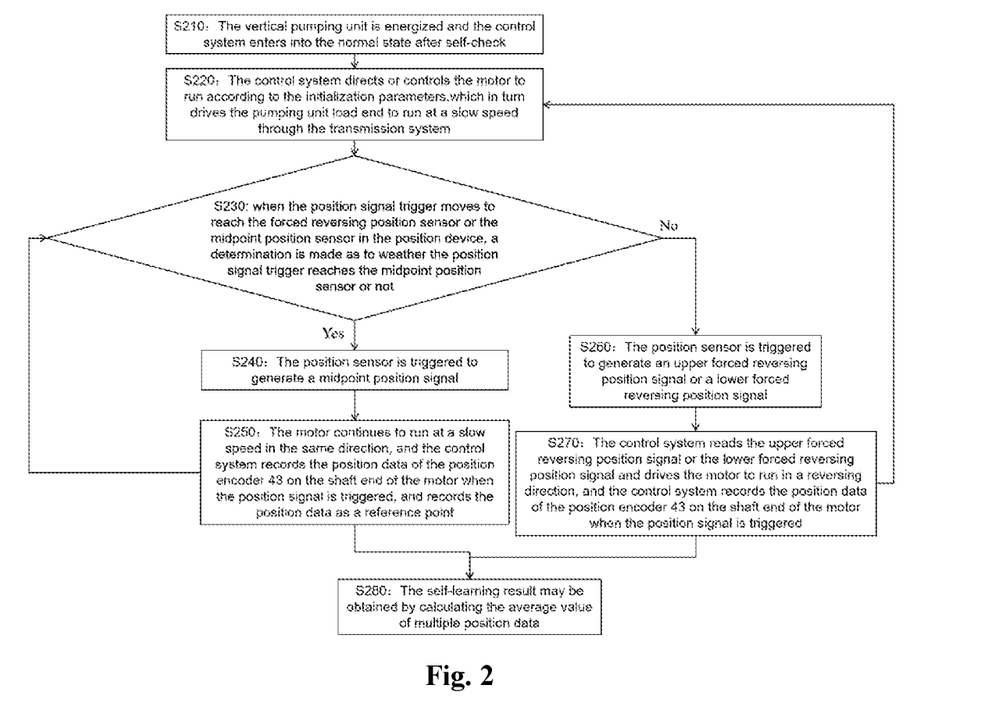
FIG. 2 is a workflow chart of an embodiment of the self-learning phase in the control method of the present disclosure.

FIG. 2 shows a preferred embodiment of the self-learning phase in the control method of the present disclosure. Specifically, the self-learning phase comprises the steps described below.

First, the vertical pumping unit is energized and the control system enters into the normal state after self-check (S210). Then, the control system directs or controls the motor to run according to the initialization parameters, i.e., the initial full stroke length and initial stroke frequency, which in turn drives the pumping unit load end to run at a slow speed through the transmission system (S220). Here, a position signal trigger 341 is installed on the transmission system.

Second, in each stroke cycle, when the position signal trigger 341 moves to reach the forced reversing position sensor or the midpoint position sensor in the position sensor device 41, a determination is made as to whether the position signal trigger 341 reaches the midpoint position of the position sensor device 41 or not (S230).

If the result of determination is yes, the position sensor device 41 is triggered to generate a midpoint position signal (S240), and the motor continues to run at a slow speed in the same direction. At the same time, the control system records the position data of the position encoder 43 on the shaft end of the motor when the position signal is triggered, and records the position data as a reference point (S250).

If the result of determination is no, the position sensor device 41 is triggered to generate an upper forced reversing position signal or a lower forced reversing position signal (S260), and the control system reads the upper forced reversing position signal or the lower forced reversing position signal and drives the motor to run in a reversing direction. At the same time, the control system records the position data of the position encoder 43 on the shaft end of the motor when the position signal is triggered (S270).

Third, the position sensor device 41 is triggered to generate two upper forced reversing position signals or two lower forced reversing position signals, which define a complete stroke cycle in the control system. The stroke frequency required for self-learning may be preset in the system. The machine runs at the preset stroke frequency, and the self-learning result may be obtained by calculating the average value of multiple position data (S280).

Here the self-learning result may comprise a first self-learning result and a second self-learning result.

The first self-learning result is the average value of the encoder associated with full stroke length. The average value of the encoder is determined as the sum of the absolute value of the position encoder 43 corresponding to the upper forced reversing position signal and the absolute value of the position encoder 43 corresponding to the lower forced reversing position signal in the multi-stroke self-learning process, wherein the first self-learning result is given by:

$$Y=\alpha X,$$

where Y is the average value of the encoder associated with the full stroke obtained in the self-learning phase, and X is the full stroke length preset in the self-learning phase, and α is the conversion factor for the average value of the encoder obtained in the self-learning phase and the full stroke length preset in the self-learning phase.

The second self-learning result is associated with the corresponding average value of the encoder for upper half stroke and the average value of the encoder for lower half stroke. The average value of the encoder for upper half stroke is the difference between the absolute value of the position encoder 43 corresponding to the upper forced reversing position signal and the absolute value of the position encoder 43 corresponding to the midpoint position signal in the multi-stroke self-learning process. And the average value of the encoder for upper half stroke is associated with the upper half stroke of the full stroke. The average value of the encoder for lower half stroke is the difference between the absolute value of the position encoder 43 corresponding to the lower forced reversing position signal and the absolute of the position encoder 43 corresponding to the midpoint position signal in the multi-stroke self-learning process. And the average value of the lower half stroke is associated with the lower half stroke of the full stroke.

In one embodiment, the self-learning phase further comprises shutting down the pumping unit forcibly when the position signal trigger reaches the limit position.

In one embodiment, the position sensor device comprises a midpoint position sensor, an upper forced reversing position sensor and a lower forced reversing position sensor. The position signal trigger can be a rotary disc type position signal trigger or a translational type position signal trigger.

Figure 3:
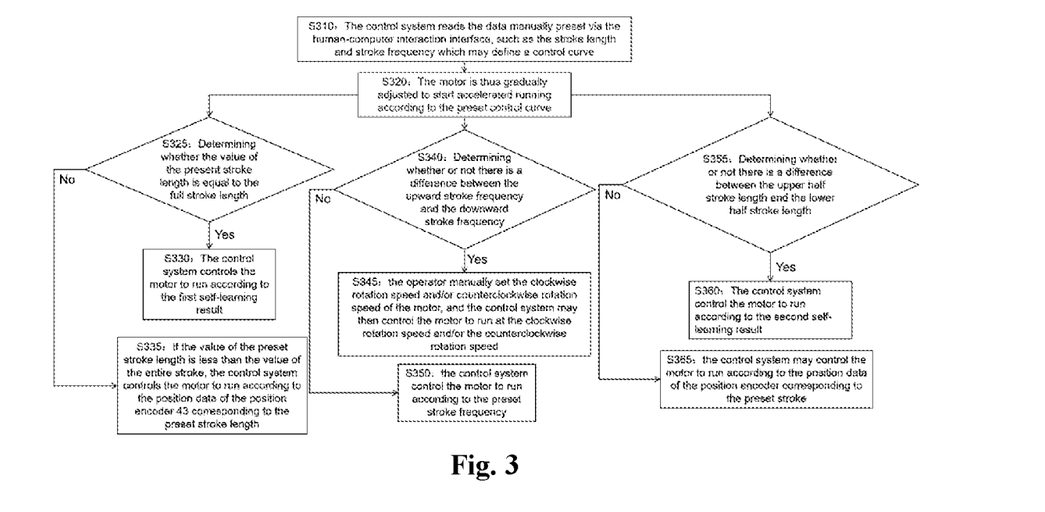
FIG. 3 is a workflow chart of an embodiment of the running phase in the control method of the present disclosure.

FIG. 3 shows a preferred embodiment of the running phase in the control method of the present disclosure. Specifically, the running phase comprises the following steps.

First, the control system reads the parameters manually preset via the human-computer interaction interface, such as the stroke length and stroke frequency which may define a control curve (S310). The preset stroke length may be converted into the position value of the position encoder 43 corresponding to the preset stroke length, and the motor is thus gradually adjusted to start accelerated running according to the preset control curve (S320). When the motor reaches the position value, the driving system controls the motor to reverse forcibly.

Three kinds of determination and corresponding controls are carried out in the running process: (1) determining whether the value of the preset stroke length is equal to the value of the full stroke length (S325); (2) determining whether or not there is a difference between the upward stroke frequency and the downward stroke frequency (S340); and (3) determining whether or not there is a difference between the upper half stroke length and the lower half stroke length (S355).

With respect to the first determination (S325), if the value of the preset stroke length is equal to the value of the full stroke length, the control system controls the motor to run according to the first self-learning result, that is, the average value of the encoder that is associated with the full stroke length obtained in the self-learning phase (S330). However, if the value of the preset stroke length is less than the value of the full stroke, the control system controls the motor to run corresponding value of the position encoder 43 associated to the preset stroke length (S335).

With respect to the second determination (S340), if there is a difference between the upward stroke frequency and the downward stroke frequency, the operator may manually set the clockwise rotation speed and/or counterclockwise rotation speed of the motor, and the control system may then control the motor to run at the clockwise rotation speed and/or the counterclockwise rotation speed (S345). However, if there is no difference, the control system may control the motor to run according to the preset stroke frequency (S350).

And with respect to the third determination (S355), if there is a difference between the upper half stroke length and the lower half stroke length, the control system may control the motor to run according to the second self-learning result, that is, the average value of the encoder for the upper half stroke and the average value of the encoder for the lower half stroke obtained in the self-learning phase (S360). However, if there is no difference, the control system may control the motor to run according to the position value of the position encoder corresponding to the preset stroke length (S365).

In a preferred embodiment, the running phase further comprises shutting down the pumping unit forcibly when the position signal trigger reaches the limit position.

Figure 4:
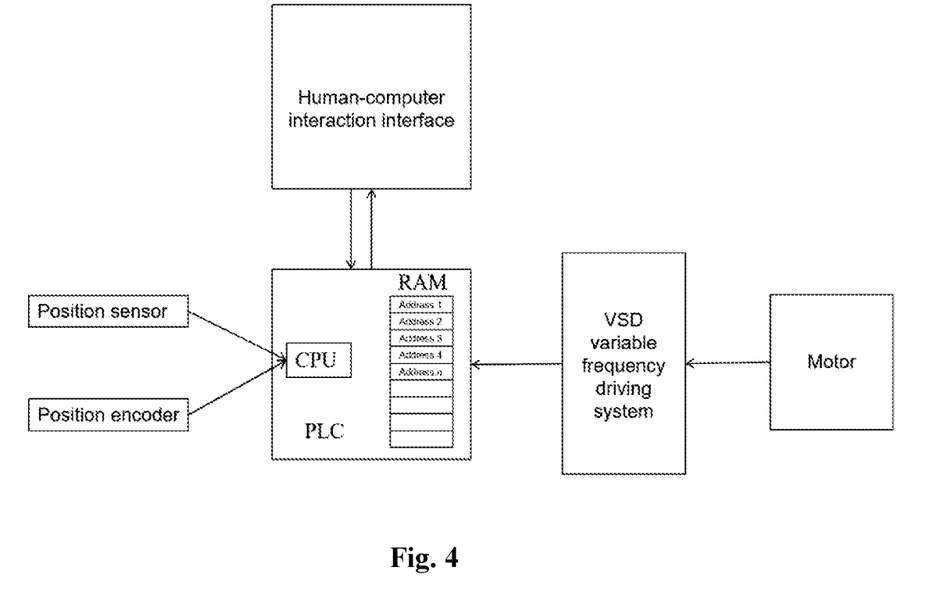
FIG. 4 is a workflow chart of the control system of the present disclosure.

FIG. 4 shows a preferred embodiment of the control system of the present disclosure. The control system comprises a control cabinet 42, a programmable logic controller (PLC) 420, a position sensor device 41, a position signal trigger device 341 (not shown), a position encoder 43, and a VSD variable frequency driving system 430. The control system may further comprise a remote communication modulus and a remote monitoring system, as shown in FIG. 1. The control system is configured to implement the above-mentioned method for the control system of the vertical pumping unit.

The programmable logic controller (PLC) 420 may be a digital operation controller with a microprocessor for automatic control which may load control instructions into the memory at any time for storage and execution.

The position sensor device 41 may be a photoelectric sensor, a metal proximity switch, a non-metal proximity switch, a magnetic metal proximity switch, a capacitive proximity switch or an Omron proximity switch. For example, the position sensor device may be an Omron proximity switch. A wire break protector and a metal connector are employed in the Omron proximity switch which has enhanced fastening strength and strong environmental resistance and uses a more visible tail indicator. Those having ordinary skill in the art will appreciate that other proximity switches can also be used.

The position encoder 43 may be a photoelectric encoder or encoding disc which converts the mechanical geometric displacement on the output shaft into pulses or digital quantities through photoelectric conversion. Specifically, the position encoder may be an incremental encoder which converts the displacement into a periodic electrical signal and then converts the electrical signal into a countable pulse. The count of pulses may represent the magnitude of the displacement. For example, it can directly adopt the principle of photoelectric conversion to output three sets of square wave pulses: Phase-A, Phase-B, and Phase-Z. The phase difference of Phase-A and Phase-B pulses is 90° so that the rotation direction can be easily determined. Phase-Z indicates that each revolution of the encoder is one pulse, which is used to locate the reference point. The advantage of the incremental encoder is that the principle and structure thereof is simple, and the average mechanical life thereof can be more than tens of thousands of hours. The anti-interference ability thereof is strong and the reliability thereof is high. Other types of position encoders may be applied as long as a mapping relationship can be established between the movement of the pumping unit and the position data/value of the position encoder.

In a preferred embodiment, the programmable logic controller (PLC) may comprise a central processing unit. The programmable logic controller (PLC) may also comprise functional units such as a central processing unit (CPU), a memory, an input unit, an output unit and a power supply. The installation method of PLC system may vary: it may be a centralized type, a remote I/O type or a multiple-PLC network distributed type. The remote I/O type is suitable for a large-scale system. Devices within the system may be distributed in a wide range and may be dispersed and installed on-site with short connections.

The central processing unit (CPU) is the control center of the PLC and also the core component of the PLC. Its performance determines the performance of the PLC. The role of the central processing unit is to process and run user applications, perform logical and mathematical operations and control the entire system in a coordinated way.

The memory may be a random access memory (RAM) which is a semiconductor memory configured to read and write data.

In a preferred embodiment, the central processing unit may comprise a register which is used for recording the position data of the position encoder in a self-learning phase and recording preset stroke length and stroke frequency.

The central processing unit may include a controller, an arithmetic unit and a register. These circuits may be all provided on a chip and connected to the input/output interface circuit of the memory through an address bus and a control bus. The register may be a high-speed storage component with limited storage capacity used to temporarily store instructions, data and addresses.

In a preferred embodiment, the programmable logic controller may logically associate the stroke length with the position data of the position encoder so that the transmission system runs in a predetermined mode. In other words, a mapping relationship may be established between the movement of the pumping unit and the position data of the position encoder.

In a preferred embodiment, the remote monitoring system is installed in a central control room. The programmable logic controller, the power box and the remote communication modulus are installed in a control cabinet next to the rack. And the position encoder is installed on the shaft end of the motor of the driving system.

In one embodiment, the control system may run in the following way.

First, the central processing unit (CPU) of the programmable logic controller (PLC) of the control system reads the preset data including stroke length and stroke frequency from the human-computer interaction interface, and controls the motor through the VSD variable frequency driving system according to the preset data including stroke length and stroke frequency to run according to the preset control curve.

Second, when the position signal trigger of the transmission system reaches the forced reversing position sensor or the midpoint position sensor in the position sensor device, the position sensor device 41 is triggered to generate the corresponding position signal, which is transmitted to the I/O interface of the programmable logic controller (PLC).

Third, the central processing unit (CPU) of the programmable logic controller (PLC) reads the position signal and directs or controls the motor through the VSD variable frequency driving system according to the position signal to continue running in the same direction or the reversing direction. The central processing unit (CPU) acquires the position data of the position encoder on the shaft end of the motor each time the position signal is triggered.

And fourth, the register of the central processing unit (CPU) records the position data of the position encoder in the self-learning phase. From the position data, the CPU may calculate the average value of the encoder. It also records the preset stroke length and stroke frequency and stores the above-mentioned data into the corresponding address or location of the random access memory (RAM) of the programmable logic controller.

Figure 5:
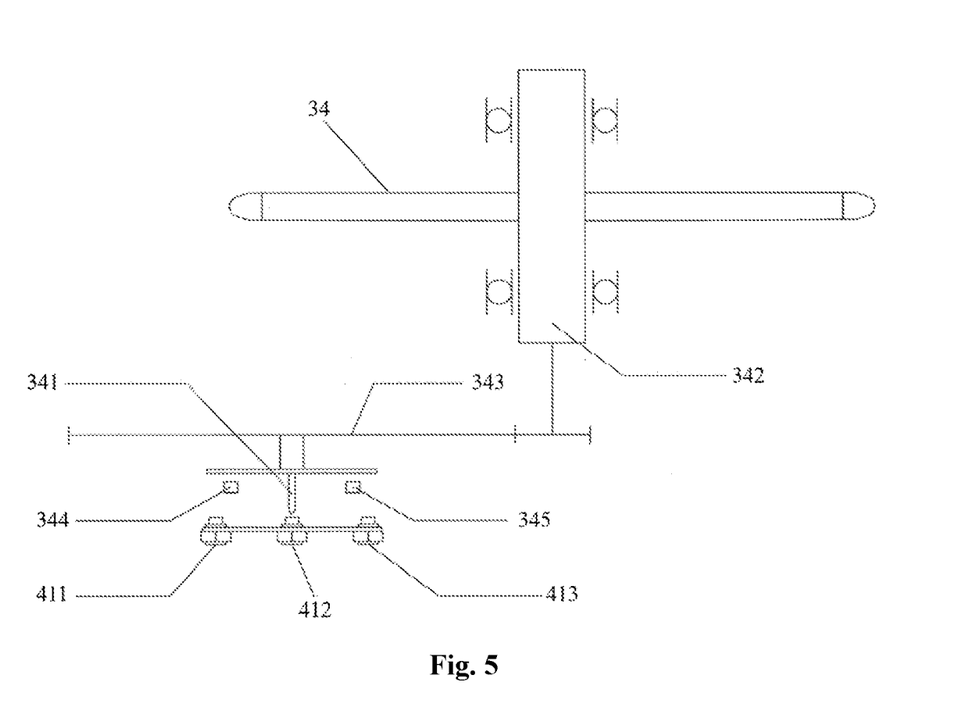
FIG. 5 is a structural schematic diagram of a position signal trigger and position sensors in the control system of the present disclosure.

FIG. 5 shows a preferred embodiment depicting how the position signal trigger and the position sensor in the control system of the present disclosure run.

In a preferred embodiment, the position sensor device 41 comprises a midpoint position sensor 412, an upper forced reversing position sensor 411 and a lower forced reversing position sensor 413. The position signal trigger 341 may be a rotary disc type position signal trigger or a translational type position signal trigger. Other types of position signal triggers may be applied without departing from the scope of the disclosure.

Take the rotary disc type position signal trigger 341 as an example. Specifically, when the upper driven sprocket 34 runs, the upper driven sprocket 34 rotates the position signal trigger 341 on the mechanical ratio device 343 through the sprocket shaft 342. When the position signal trigger 341 reaches the upper forced reversing position 411 or the midpoint position 412 or the lower forced reversing position 413 of the position sensor device 41, the position sensor device 41 is triggered to generate a corresponding position signal. The central processing unit (CPU) of the programmable logic controller (PLC) in the control system reads the position signal. When the position signal trigger 341 reaches the upper limit position 344 or the lower limit position 345, the pumping unit is shut down forcibly for safety purpose, either in a self-learning phase or in a running phase.

From the above description, it can be seen that the foregoing embodiments of the present disclosure may achieve a number of technical effects. The control method of the present disclosure enables the vertical pumping unit to adjust the running parameters in the running phase according to the self-learning result, avoid the accumulation of errors effectively so that changes in stroke length and stroke frequency caused by the motor V-belt, load belt extension and retraction and other elastic links are limited to a minimum range so as to ensure the running accuracy of the vertical pumping unit, which can be adjusted constantly at any time according to the conditions of liquid level under the well.

Various embodiments are described herein, with reference to the details discussed above, the accompanying drawings, and the claims. Numerous specific details are described to provide a thorough understanding of various embodiments. However, in certain instances, well-known or conventional details are not described in order to provide a concise discussion. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the embodiments.

The embodiments described and claimed herein and drawings are illustrative and are not to be construed as limiting the embodiments. The subject matter of this disclosure is not to be limited in scope by the specific examples, as these examples are intended as illustrations of several aspects of the embodiments. Any equivalent examples are intended to be within the scope of the disclosure. Indeed, various modifications of the disclosed embodiments in addition to those shown and described herein will become apparent to those skilled in the art, and such modifications are also intended to fall within the scope of the appended claims.

It will be understood by those skilled in the art that the drawings are diagrammatic and that further items of equipment may be required in a commercial context.

While this disclosure contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products. In addition, in the embodiments, a single step may include or be divided into multiple sub-steps. The method disclosed in the specification and the claims may be implemented in a device having components configured to execute each corresponding step in the method.

All references including patents, patent applications and publications cited herein are incorporated herein by reference in their entirety and for all purposes to the same extent as if each individual publication or patent or patent application was specifically and individually indicated to be incorporated by reference in its entirety for all purposes.

The above are exemplary embodiments of the present disclosure and not intended to limit the present disclosure. For those skilled in the art, the present disclosure may have various modifications and variations. Any modifications, equivalent replacements, improvements and the like made within the spirit and principle of the present disclosure shall fall within the scope of protection of the present disclosure.

What is claimed is:

1. A control system for a vertical pumping unit, the control system comprising:
   a programmable logic controller;
   a position sensor device;
   a position signal trigger device;
   a position encoder device;
   a remote communication modulus; and
   a remote monitoring system,
   wherein the control system is configured to control the vertical pumping unit via a method comprising:
      during a self-learning phase:
         obtaining a self-learning result;
         controlling a motor of the vertical pumping unit according to initialization parameters to drive a pumping unit load end via a transmission system, wherein the transmission system is equipped with the position signal trigger device and a shaft end of the motor is equipped with the position encoder device;
         causing the vertical pumping unit to start running according to an initial full-stroke length and an initial stroke frequency,
            wherein, in each stroke cycle, when the position signal trigger device reaches a forced reversing position sensor or a midpoint position sensor in the position sensor device, the position sensor device is triggered to generate a corresponding position signal, and wherein the control system is configured to read the position signal and control the motor to continue running in a same direction or to run in a reversing direction according to the position signal, the control system recording position data of the position encoder device each time a position signal is triggered; and
         obtaining the self-learning result by calculating the average value of the recorded position data of the position encoder device; and during a running phase:

controlling the motor of the vertical pumping unit to run according to the self-learning result and preset running parameters;

wherein the control system is configured to read and record a stroke frequency of the running phase, and wherein, when the position signal trigger device reaches a position sensor in the position sensor device, the control system is configured to read the corresponding position signal generated by the position sensor device.

2. The control system of claim 1, wherein the programmable logic controller comprises a central processing unit.

3. The control system of claim 2, wherein the central processing unit comprises a register configured to record position data of the position encoder device during the self-learning phase and record preset stroke length and stroke frequency.

4. The control system of claim 2, wherein the programmable logic controller is configured to logically associate a preset stroke length with a position value of the position encoder device so that a transmission system of the vertical pumping unit runs in a predetermined mode.

5. The control system of claim 1, wherein:

the remote monitoring system is installed in a central control room;

the programmable logic controller and the remote communication modulus are installed in a control cabinet next to a rack; and the position encoder device is installed on a shaft end of a driving motor of a driving system of the vertical pumping unit.

* * * * *